US009763012B2

(12) United States Patent
Kawka et al.

(10) Patent No.: US 9,763,012 B2
(45) Date of Patent: Sep. 12, 2017

(54) MONOFILAMENT FABRIC ACOUSTIC SUSPENSION ELEMENTS

(75) Inventors: Marek Kawka, Bolton, MA (US); Yang Liu, Framingham, MA (US); Weidong Zhu, Newton, MA (US)

(73) Assignee: Bose Corporation, Framingham, MA (US)

( * ) Notice: Subject to any disclaimer, the term of this patent is extended or adjusted under 35 U.S.C. 154(b) by 1588 days.

(21) Appl. No.: 13/075,598

(22) Filed: Mar. 30, 2011

(65) Prior Publication Data

US 2012/0251812 A1 Oct. 4, 2012

(51) Int. Cl.

| | |
|---|---|
| ***B32B 27/02*** | (2006.01) |
| ***H04R 9/04*** | (2006.01) |
| ***H04R 31/00*** | (2006.01) |
| ***H04R 7/20*** | (2006.01) |
| *H04R 1/28* | (2006.01) |

(52) U.S. Cl.

CPC ............... *H04R 9/043* (2013.01); *H04R 7/20* (2013.01); *H04R 31/003* (2013.01); *H04R 1/2834* (2013.01); *Y10T 428/249922* (2015.04); *Y10T 442/2861* (2015.04); *Y10T 442/30* (2015.04)

(58) Field of Classification Search

CPC ...... H04R 1/2834; H04R 31/003; H04R 7/20; H04R 9/043

USPC .................................. 428/222; 442/181, 164

See application file for complete search history.

(56) References Cited

U.S. PATENT DOCUMENTS

| | | | |
|---|---|---|---|
| 2,275,598 | A | 3/1942 | Andrus |
| 3,874,422 | A | 4/1975 | Dow |
| 4,239,944 | A | 12/1980 | Obara et al. |
| 4,968,551 | A | 11/1990 | Kusanagi et al. |
| 5,031,720 | A | 7/1991 | Ohta et al. |
| 5,408,056 | A | 4/1995 | Thomas |
| 5,878,150 | A | 3/1999 | Okazaki et al. |
| 7,386,144 | B2 | 6/2008 | Vincent et al. |
| 8,002,079 | B2 | 8/2011 | Funahashi |
| 2005/0254682 | A1 | 11/2005 | Maekawa et al. |
| 2006/0193488 | A1 | 8/2006 | Hachiya et al. |
| 2006/0249327 | A1 | 11/2006 | Sato et al. |

FOREIGN PATENT DOCUMENTS

| | | | |
|---|---|---|---|
| CN | 1115557 | A | 1/1996 |
| CN | 1936138 | A | 3/2007 |
| EP | 263392 | A2 | 4/1988 |
| EP | 0322587 | A2 | 7/1989 |
| EP | 508596 | A1 | 10/1992 |

(Continued)

OTHER PUBLICATIONS

Definition of a wire, http://dictionary.reference.com/browse/wire.*

(Continued)

*Primary Examiner* — Peter Y Choi
*Assistant Examiner* — Vincent A Tatesure

(57) ABSTRACT

A method for forming a suspension element for an acoustic driver. The method includes placing an unimpregnated fabric formed from a monofilament polymer fiber in a mold, the monofilament fiber characterized by a softening point and a melting point; heating the mold and the unimpregnated fabric to a temperature greater than the softening point and less than the melting point; and cooling the mold.

16 Claims, 5 Drawing Sheets

(56) References Cited

FOREIGN PATENT DOCUMENTS

| | | | |
|---|---|---|---|
| EP | 0675668 | A1 | 10/1995 |
| EP | 1351547 | A2 | 10/2003 |
| EP | 1411747 | A2 | 4/2004 |
| GB | 436580 | A | 10/1935 |
| GB | 2322505 | A | 8/1998 |
| GB | 2358545 | A | 7/2001 |
| JP | 62263799 | A | 11/1987 |
| JP | 2151200 | A | 6/1990 |
| JP | 4340898 | A | 11/1992 |
| JP | 06038296 | A | 2/1994 |
| JP | 11298993 | A | 10/1999 |
| JP | 2000152382 | A | 5/2000 |
| JP | 2000156899 | A | 6/2000 |
| JP | 2005303902 | A | 10/2005 |
| JP | 2007110296 | A | 4/2007 |
| JP | 2009-177290 | A | 8/2009 |
| JP | 2009-239589 | A | 10/2009 |
| TW | 516571 | U | 1/2003 |
| TW | 200712271 | | 4/2007 |
| WO | 2011016291 | A1 | 2/2011 |

OTHER PUBLICATIONS

International Search Report and Written Opinion dated May 29, 2012 for International Application No. PCT/US2012/030344.
CN Office Action dated Jun. 24, 2015 for CN2012800154371.

* cited by examiner

Plain (Square) Weave

Twill Weave

Plain Reverse Dutch Weave

Triaxial Weave

Tetra-axial weave

MONOFILAMENT FABRIC ACOUSTIC SUSPENSION ELEMENTS

BACKGROUND

This specification relates to suspensions for moving parts of electroacoustical transducers.

SUMMARY

In one aspect of the specification, a method for forming a suspension element for an acoustic driver includes placing an unimpregnated fabric formed from a monofilament polymer fiber in a mold. The monofilament fiber is characterized by a softening point and a melting point. The method further includes heating the mold and the unimpregnated fabric to a temperature greater than the softening point and less than the melting point and cooling the mold. The method may further include coating the suspension element with an elastomer in a manner that bonds but does not fuse fiber intersections. The coating may include coating the suspension element so that openings in the fabric are sealed. The coating may include coating the suspension element in a manner that air can flow through openings in the fabric. The coating may be performed prior to placing the unimpregnated fabric in the mold. The method may further include removing the fabric from the mold. The coating may be performed subsequent to the removing the fabric from the mold. The method may further include forming convolutions in the suspension element. The method may further include forming in the surround a half roll with a series of grooves extending from an inner circumferential edge to an outer circumferential edge at an angle to the normal of an inner edge of the surround at the point of the groove closest to the inner circumferential edge. The fabric may be formed from bunched monofilament polymer fibers.

In another aspect of the specification, a suspension element for a acoustic driver includes a fabric formed from a monofilament polymer fiber, woven so that the fibers are not fused at the intersections of the fibers. The fabric may be unimpregnated. The suspension may include radial convolutions. The suspension element may include a half roll geometry with grooves at an angle to the normal of an inner edge of the suspension element at the point of the groove closest to an inner circumferential edge. The polymer may be polyester. The polymer may be PEEK. The polymer may be PPS. The suspension element may further include a coating of a soft polymer. The suspension may be sealed so that air does not flow through the fabric. The suspension element may be not sealed so that air does flow through the fabric. The soft polymer may be a synthetic rubber. The soft polymer may have a modulus of elasticity of 100 megapascals or less. The soft polymer may have a modulus of elasticity of 1 megapascal or less. The fabric may be formed from bunched monofilament fibers. The suspension element may be a surround. The suspension element may be a spider.

Other features, objects, and advantages will become apparent from the following detailed description, when read in connection with the following drawing, in which:

DETAILED DESCRIPTION

A "filament" as used herein, is an object characterized by flexibility, fineness, and a very high ratio (typically at least 100:1 or more) of length to thickness. Filaments are building blocks for higher level elements, such as fibers, thread, yarns, ropes, cords, string, and the like. A "fiber", as used herein, comprises at least one filament, but may include many filaments. Fibers are frequently used as the basic element from which fabric is made. A fiber that has only one filament, so that the filament and the fiber coincide, is a "monofilament" fiber. An example of a monofilament fiber is monofilament fishing line.

Multifilament fibers may be bunched monofilament fibers or staple fibers. "Bunched monofilament fibers" refers to fibers with two or more monofilaments that are aggregated so that they can be used (for example woven) or processed (for example, wound on a spool) as one fiber. Each of the fibers of the aggregation is continuous from one end to the other. If the bunched monofilament fibers are disaggregated into individual monofilament fibers, each of the disaggregated bunched monofilament fibers would be of substantially the same length as the bunched fiber aggregation, or longer. The individual monofilament fibers of the bunched monofilament fibers may be twisted or braided. An example of a structure analogous to bunched monofilament fibers is braided wire cable, in which the individual wires are analogous to the individual monofilament fibers. The ends of the bunched monofilament fibers are typically fused or bound.

Figure 1:
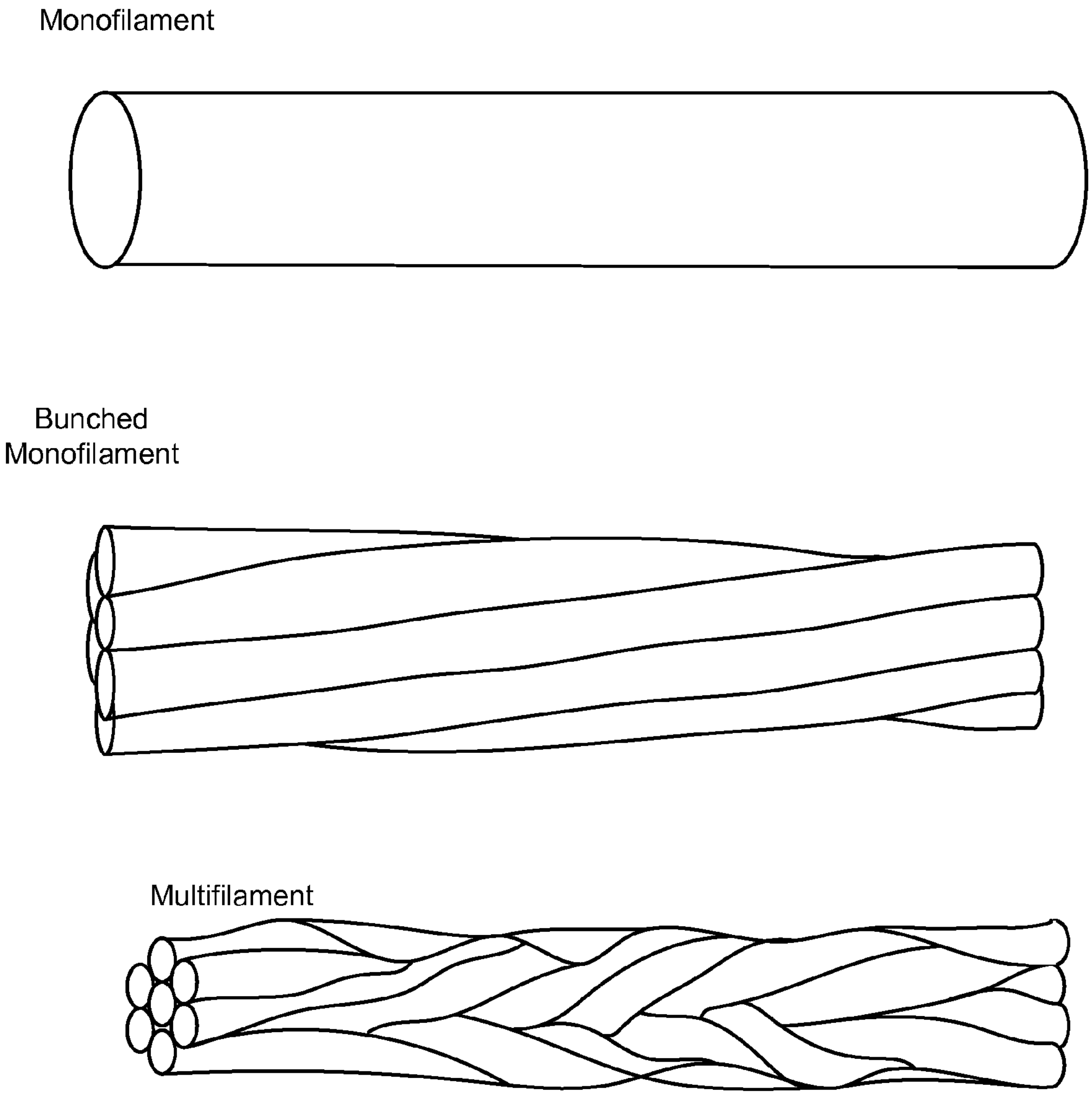
FIG. 1 is a view of various kinds of fibers.

A "staple fiber", as used herein, is a fiber that includes filaments that are shorter, and may be substantially shorter, that the length of the of the fiber. The filaments may be twisted or spun to form the multifilament staple fiber. Examples of multifilament staple fibers are cotton thread and wool yarn. Examples of a monofilament fiber, a bunched monofilament fiber, and a staple fiber are shown in FIG. 1.

Figure 2A:
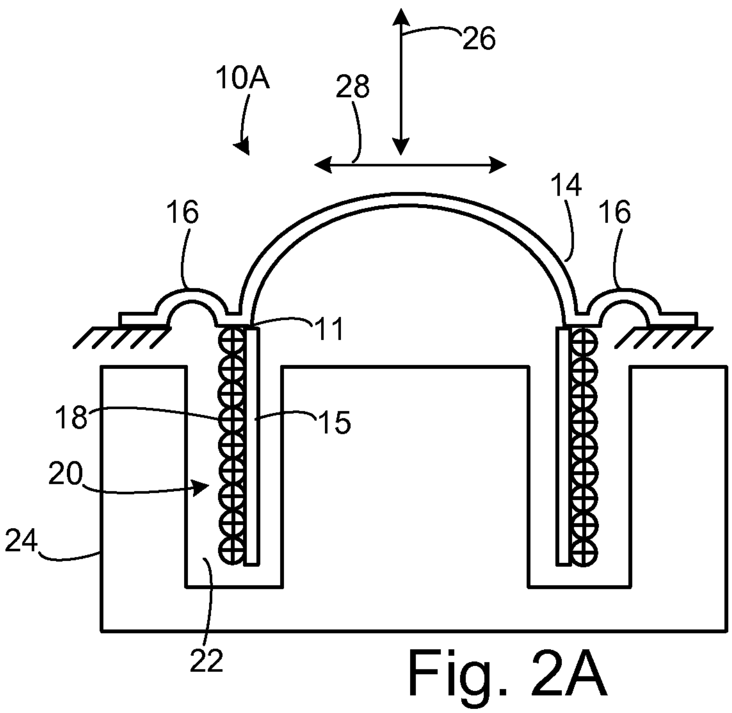
FIG. 2A is a simplified cross sectional view of a transducer.

FIG. 2A is a simplified cross-sectional view of a first electroacoustical transducer configuration. A loudspeaker 10A includes a cylindrical bobbin mechanically coupled at a first end 11 for example, by adhesive, to an acoustic diaphragm 14. The acoustic diaphragm is mechanically coupled at the periphery by a suspension element 16 to a frame, represented here as a mechanical ground. Wrapped around the bobbin 12 is a voice coil winding 18 to form a voice coil assembly 20. The voice coil assembly 20 is positioned in a gap 22 of a magnetic structure 24.

A suspension element 16 that mechanically couples the periphery of an acoustic diaphragm 14 to a frame is called a "surround". Ideally, the surround permits motion in the direction indicated by arrow 26, but opposes lateral motion in the direction indicated by arrow 28. The configuration of FIG. 2A is suited to electroacoustical transducers designed to move short distances and displace relatively small volumes of air, for example, small transducers (such as headphone transducers).

Figure 2B:
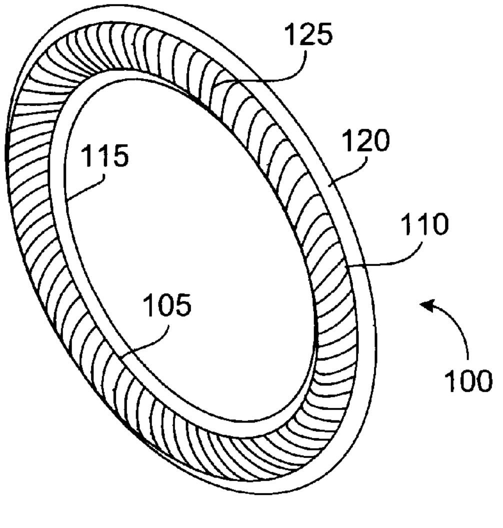
FIG. 2B is an isometric view of a surround.

A typical geometry for a surround is a "half roll" surround, as shown in FIG. 2A. Other common geometries include multiple half rolls, alternating concave and convex half rolls, and other more complex geometries. For example, in the surround 100 of FIG. 2B a series of grooves 125 extends from an inner circumferential edge 105 to an outer circumferential edge 110 at an angle to the radial direction, or more generally, at an angle to the normal of the inner edge of the surround at the point of the groove closest to the inner circumferential edge. The surround 100 includes an inner attachment flange 115 and an outer attachment flange 125.

Figure 3:
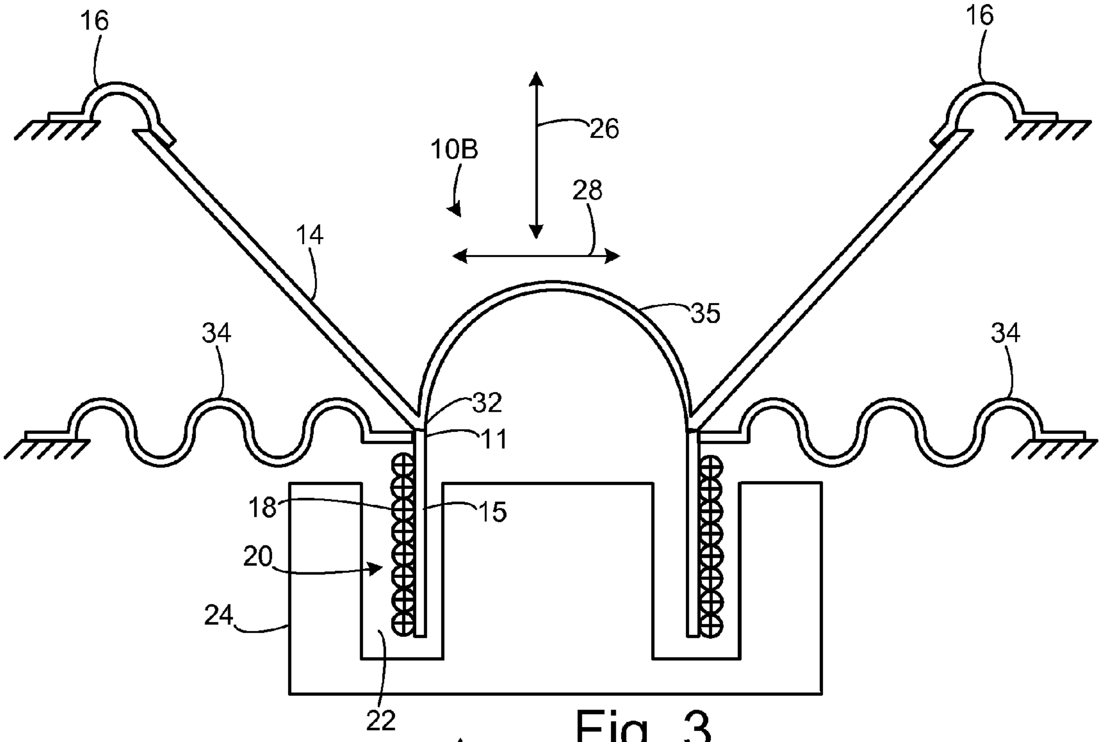
FIG. 3 is a simplified cross sectional view of a transducer.

FIG. 3 shows a simplified cross-sectional view of a second electroacoustical transducer configuration. In the configuration of FIG. 3, the acoustic diaphragm has a frustoconical shape. Similar to the configuration of FIG. 2A, the acoustic diaphragm is mechanically coupled at the periphery by a suspension element 16 to a frame, represented here as a mechanical ground. In the configuration of FIG. 3, an inner edge 32 of the acoustic diaphragm 14 is mechanically coupled to a first end 11, for example by adhesive, the voice coil assembly 20. The end 11 of the voice coil assembly that is coupled to an inner edge 32 of the acoustic diaphragm is typically covered by a "dust cover" 35 that forms a part of the acoustic radiating surface. The voice coil assembly 20 is mechanically coupled to a frame, represented here as a mechanical ground, by a second suspension element 34, typically referred to as a "spider". The configuration of FIG. 3 is suited to electroacoustical transducers designed for the diaphragms to move longer distances and displace larger volumes of air than transducers with the configuration of FIG. 2A.

A typical geometry for a spider has a corrugation pattern as in FIG. 3. Similar to the suspension element 16, the suspension element 34 opposes lateral motion to keep the voice coil assembly 20 in the magnetic gap 22, while permitting motion in the direction indicated by arrow 26.

The configurations of FIGS. 2A and 3 operate similarly. The voice coil assembly 14 and the magnet structure 24 act as a linear motor. Alternating electrical current corresponding to an audio signal in the voice coil winding interacts with the magnetic field in the gap of the magnetic structure to cause the voice coil structure to move along the axis indicated by arrow 26. The movement of the voice coil causes movement of the acoustic diaphragm 14. The movement of the acoustic diaphragm compresses and rarefies the air, which causes pressure waves to be generated. The pressure waves are perceived as sound.

Figure 4:
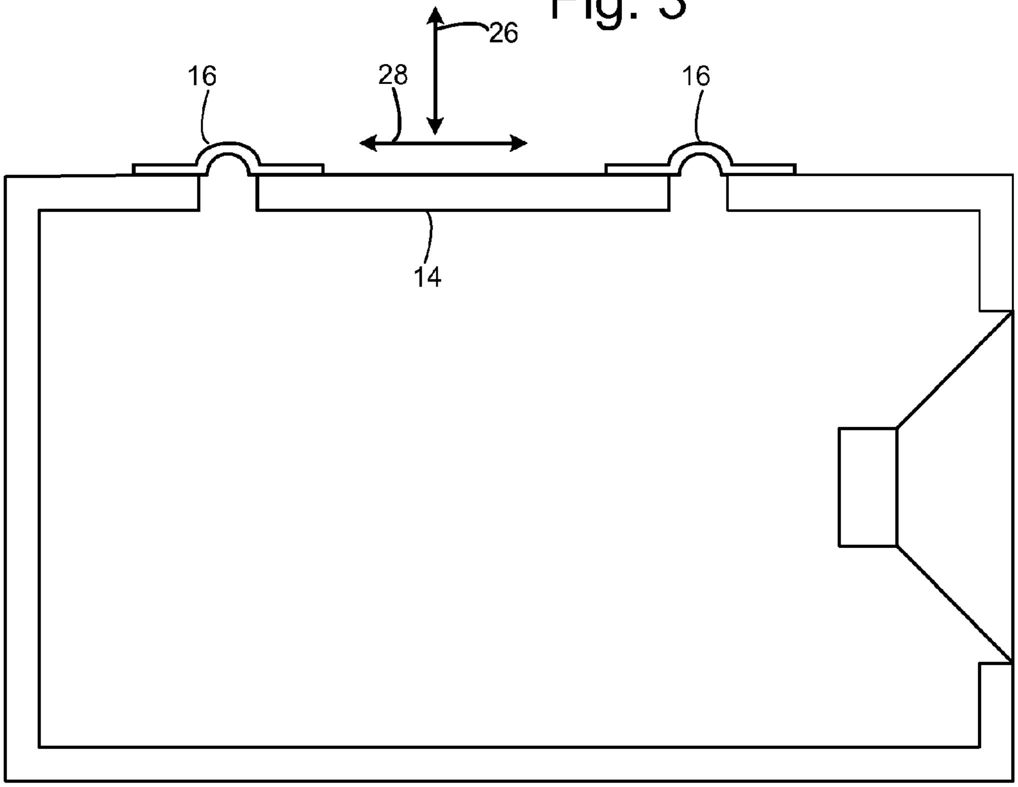
FIG. 4 is a simplified cross sectional view of a loudspeaker with a passive radiator.

Passive radiators typically have surrounds, and may in some complex geometries have spiders. FIG. 4 is a simplified cross-sectional view of a loudspeaker including a passive radiator with a surround. An electroacoustical transducer 110, similar, for example, to the electroacoustical transducer of FIG. 3 is mounted in an opening in an enclosure 112. Also mounted in an opening enclosure 112 is a passive radiator structure including an acoustic diaphragm 14 mechanically coupled at the periphery by a suspension element 16 to the enclosure 112. The electroacoustical transducer 110 operates in the manner described in the discussion of FIG. 3. The operation of the electroacoustical transducer causes pressure variations within the enclosure 112. The pressure variations cause the acoustic diaphragm 14 to vibrate in the direction of arrow 26. The vibration of the acoustic diaphragm compresses and rarefies the air, which causes pressure waves to be generated. The pressure waves are perceived as sound. Passive radiators with spiders and surrounds typically resemble the configuration of FIG. 4, without the magnet structure 24, the voice coil 18, and in some cases without the bobbin 15.

Some characteristics are desirable for both surround suspension elements 16 and spider suspension elements 34. Both surrounds and spiders should be sufficiently compliant in the direction indicated by arrow 26 (the intended direction of motion of the acoustic diaphragm) to permit a desired amount of travel. Surrounds and spiders should also to provide sufficient restoring force to urge the acoustic diaphragm toward a neutral position. For best acoustic performance, the restoring force should be linear with displacement. Both surrounds and spiders should have stiffness in the direction 28 transverse to the direction of intended motion. In the case of transducers, the stiffness should be sufficient to keep the voice coil in the magnetic gap 22, while permitting the gap to be as small as possible. In the case of passive radiators, the stiffness should be sufficient to resist lateral movement and to resist undesirable modes such as rocking modes. The restoring force should not be subject to excessive "break-in", that is, restoring force should not vary over time and operating cycles, which can number in the millions. Light weight is also a desirable property for both spiders and surrounds.

Some characteristics that may be important for surrounds may be less important or even undesirable for spiders and vice versa. For example, since the surround suspension element may be a part of the radiating surface of the acoustical diaphragm, surrounds typically need to be pneumatically sealed. On the other hand, it may be desirable for spiders to be "breathable". It may be desirable for spiders and/or surrounds to be water and/or detergent resistant, and it may be desirable for spiders to operate at relatively high temperatures.

One class of materials that provides the desirable characteristics that are common to spiders and to surrounds and that can be easily modified to provide the characteristics that are unique to surrounds or for spiders is fabric woven from monofilament fibers.

Figure 5:
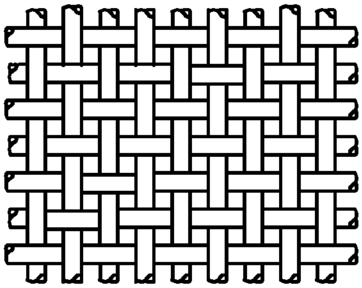
FIG. 5 is a plan view of various kinds of weave patterns.
Figure 5:
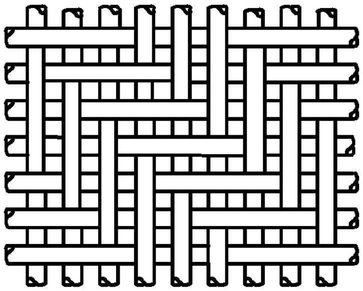
Figure 5:
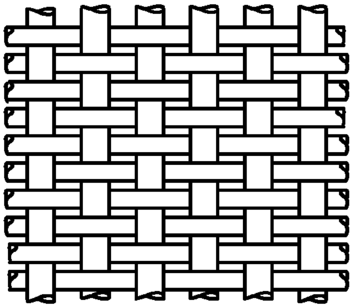
Figure 5:
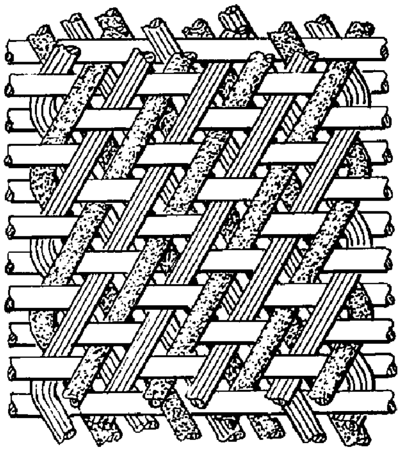
Figure 5:
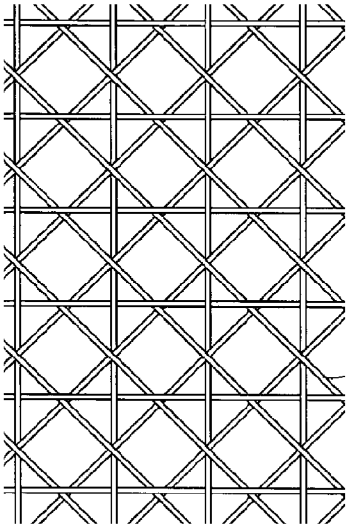

The monofilament fibers are woven into fabric with various weave patterns. For example, FIG. 5 shows five different weave patterns: plain (sometimes called "square"), twill, plain reverse Dutch weave, tri-axial, and tetra-axial.

Figure 6:
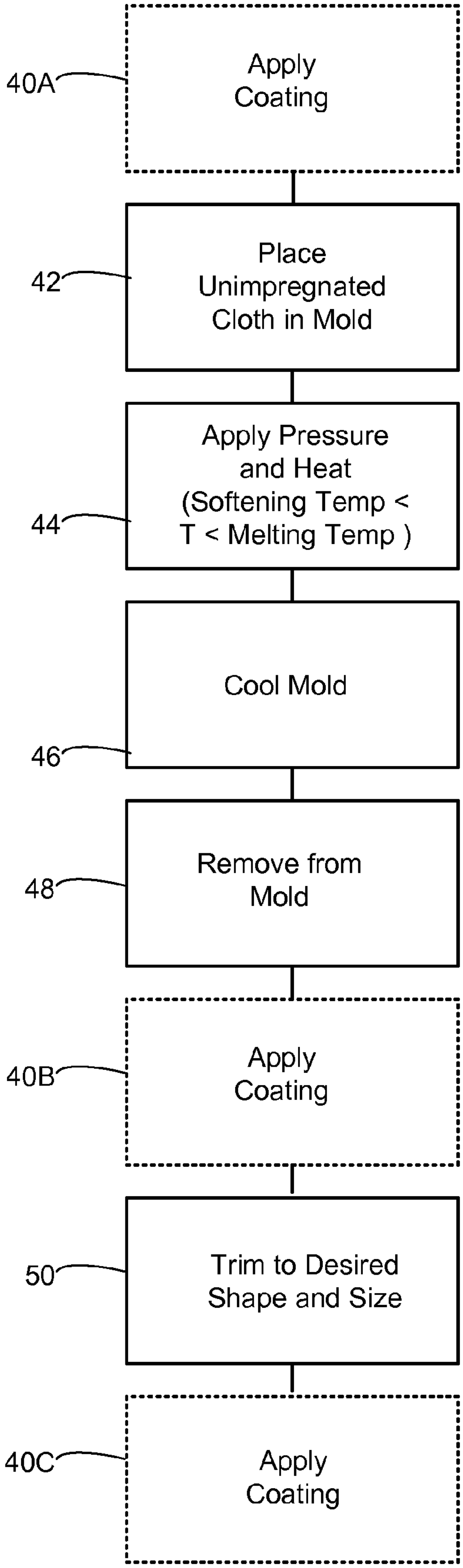
FIG. 6 is a block diagram of a process for forming a suspension element.

FIG. 6 shows a process for forming a suspension element from fabric woven from monofilament fiber. Block 40A will be discussed below. At block 42, the fabric is placed into a mold. The fabric may have previously been coated, but is unimpregnated, as will be explained below. At block 44, pressure is applied to the mold and heat is applied to form the features of suspension element, for example the features of the surrounds of FIGS. 2A and 2B or the corrugations of FIG. 3. The heat applied is sufficient to cause the monofilament fibers to soften, but not to melt, so that the fibers may bond, but do not fuse where the fibers are in contact. At block 46, the mold is cooled, and at block 48, the suspension element is removed from the mold. At block 50, the suspension element is trimmed to the desired shape and size.

The fabric may be coated with an elastomer or soft polymer that does not fuse the monofilament fibers at the intersections. The coating is not required to permit the fabric to maintain the shape of the mold, so the coating may be applied at any convenient point, for example, prior to insertion in the mold, as in block 40A; after removal from the mold, as in block 40B, or after trimming, as in block 40C. The coating may also be applied to the fibers prior to forming the fibers into fabric.

The coating material can modify the characteristics of the fabric in a number of ways. For example, the coating may seal the fabric pneumatically or hydraulically or both; may modify the damping characteristics of the fabric; may strengthen the fabric; may modify the shear modulus of the fabric; and others.

The coating material should not be brittle. The specific material for the coating depends on the properties of the monofilament fiber and of the desired properties of the suspension element. As stated above, the coating material is not required to provide stiffness or formability to the fabric, so the material can be quite soft, for example, with an elastic modulus of 100 megapascals or less, or even 1 megapascal or less. One material class that works for a wide variety of transducer suspension elements usable in a wide variety of applications is synthetic rubber.

The coating may be applied in a number of ways. For example, the coating may be dissolved in a solvent and the fabric dipped in the solution. The coating may be applied with a roller. The coating may be sprayed onto the fabric. Prior to dipping, rolling, or spraying, a mask can be applied to the fabric so that the thickness of the coating can vary at points on the suspension element. For example, the thickness of the coating may vary depending on the radial distance from the center. Subsequent to dipping, rolling, or spraying, the fabric may be exposed to an air brush so that the fabric is made "breathable".

The pressure applied to the mold at block 42 places stress on the fabric. The heat applied at block 42 is sufficient to cause the fabric to relax and inelastically deform to permit the fabric to maintain the shape of the mold when removed from the mold, but the heat is not sufficient to cause the fabric to melt so that the fibers fuse.

Figure 7:
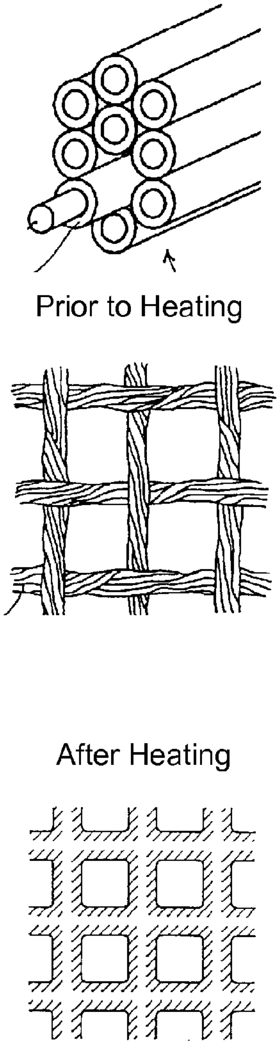
Prior Art Fig. 7
FIG. 7 is a prior art view of fibers prior to and after heating.

The process of FIG. 6 is advantageous over processes for forming suspension elements from fabric woven from conventional non-plastic staple fibers. Conventional multifilament staple fibers do not maintain shape when they are formed, so conventional multifilament fibers are impregnated with a resin before forming into suspension elements, as described. Alternatively, some conventional multifilament staple fibers may have the impregnation in the form of a core/sheath structure, for example as described in U.S. Pat. No. 5,878,150 and shown in FIG. 7, with the core of one resin and the sheath of another resin. Suspension elements formed from resin impregnated fibers are brittle and stiff, with elastic modulus of resin, on the order of 1 gigapascal or greater, and often have break-in problems and are subject to fatigue (that is, the suspension elements lose restoring force over time and over many cycles).

Additionally, the process of FIG. 6 is advantageous over processes for forming suspension elements that include heating the suspension element to above the melting temperature of the material from which the fabric is woven (or the melting temperature of the sheath material if the fiber has a sheath/core structure, for example as described in U.S. Pat. No. 5,878,150 and shown in FIG. 7). Heating the suspension element to above the melting temperature of the material causes fusing where the fibers intersect. The fusing can lead to stresses concentration points when the suspension is in use. By contrast, heating the suspension element made of monofilament fabric to a temperature higher than the softening temperature, but lower than the melting temperature permits the fabric to be formed to the desired geometry, but does not cause fusing of the fibers where the fibers intersect. The suspension of monofilament fabric maintains the shape of the mold without requiring fusing of the fibers or resin impregnation or any additional coating.

There are many fabrics that are suitable for suspension elements, and many monofilament fibers that are suitable to be woven into fabric for suspension elements. Desirable properties include high tensile strength, thermal stability, creep resistance, fatigue resistance, ductility, low moisture absorption, environmental stability, and others. Examples of suitable materials include polyester ether ketone (PEEK) marketed as Aptive® 1000-300 by Victrex (URL victrex.com), polyethylene terephthalate (PET), a polyester marketed as MYLAR® A by DuPont, and polyphenylene sulfide (PPS) marketed as RYTON® by Chevron Phillips LLC.

Table 1 shows some sample materials with the melting point and the softening point.

| | PET (polyethylene terephthalate) | PPS (polyphenylene sulfide) | PEEK (polyester ether ketone) |
|---|---|---|---|
| Melting Point ° C. | 250-260 | 285 | 334 |
| Softening Point ° C. | 220-240 | 200 | 300 |

It is desirable for the softening point to be well above the working range of the transducer, typically in the range of 40-150° C.

In one implementation, a surround is formed from PET with a melting point of 254° C. and a softening point of 220° C. The surround is placed in a mold and heated to 220° C. for 10 seconds and cooled for 2 minutes. The surround is coated with rubber with a synthetic rubber. In one implementation, a spider is formed from PET with a melting point of 254° C. and a softening point of 220° C. The spider is placed in a mold and heated to 220° C. for 30 seconds and cooled for 2 minutes. The spider is then coated with a synthetic rubber.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A suspension element for an acoustic driver, comprising:

a fabric formed from a monofilament polymer fiber, woven so that the fibers are not fused at the intersections of the fibers.

2. The suspension element of claim 1, wherein the fabric is unimpregnated.

3. The suspension element of claim 1, comprising radial convolutions.

4. The suspension element of claim 1, comprising a half roll geometry with grooves at an angle to the normal of an inner edge of the suspension element at the point of the groove closest to an inner circumferential edge.

5. The suspension element of claim 1, wherein the polymer is PET.

6. The suspension element of claim 1, wherein the polymer is PEEK.

7. The suspension element of claim 1, further comprising a coating of a soft polymer.

8. The suspension element of claim 7, wherein the suspension element is sealed so that air does not flow through the fabric.

9. The suspension element of claim 7, wherein the suspension element is not sealed so that air does flows through the fabric.

10. The suspension element of claim 7, wherein the soft polymer is a synthetic rubber.

11. The suspension element of claim 7, wherein the soft polymer has a modulus of elasticity of 100 megapascals or less.

12. The suspension element of claim 11, wherein the soft polymer has a modulus of elasticity of 1 megapascal or less.

13. The suspension element of claim 1, wherein the fabric is formed from bunched monofilament fibers.

14. The suspension element of claim 1, wherein the suspension element is a surround.

15. The suspension element of claim 1, wherein the suspension element is a spider.

16. The suspension element of claim 1, wherein the polymer is PPS.

* * * * *